(12) United States Patent
Rolf et al.

(10) Patent No.: US 10,914,607 B2
(45) Date of Patent: Feb. 9, 2021

(54) METHOD, APPARATUS AND COMPUTER PROGRAM PRODUCT FOR PROVIDING ROUTE GUIDANCE TO MULTIPLE POINTS OF INTEREST

(71) Applicant: HERE Global B.V., Eindhoven (NL)

(72) Inventors: Daniel Rolf, Berlin (DE); Federico Rubagotti, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 238 days.

(21) Appl. No.: 15/451,571

(22) Filed: Mar. 7, 2017

(65) Prior Publication Data

US 2018/0259356 A1    Sep. 13, 2018

(51) Int. Cl.
  *G01C 21/36* (2006.01)
  *G01C 21/34* (2006.01)
  *G01S 19/13* (2010.01)

(52) U.S. Cl.
  CPC ....... *G01C 21/3676* (2013.01); *G01C 21/343* (2013.01); *G01C 21/3644* (2013.01); *G01C 21/3682* (2013.01); *G01C 21/3617* (2013.01); *G01S 19/13* (2013.01)

(58) Field of Classification Search
  CPC combination set(s) only.
  See application file for complete search history.

(56) References Cited

U.S. PATENT DOCUMENTS

| | | | |
|---|---|---|---|
| 6,401,034 B1 | 6/2002 | Kaplan et al. | |
| 7,565,239 B2 | 7/2009 | de Silva et al. | |
| 2009/0055087 A1 | 2/2009 | Beacher | |
| 2009/0192703 A1 | 7/2009 | Hess et al. | |
| 2011/0184636 A1* | 7/2011 | Rolf | G01C 21/3617 701/532 |
| 2012/0143491 A1 | 6/2012 | Cheng | |
| 2013/0173159 A1* | 7/2013 | Trum | G01C 21/3626 701/533 |
| 2014/0075348 A1 | 3/2014 | Sathish | |
| 2014/0343848 A1 | 11/2014 | John et al. | |
| 2015/0134850 A1* | 5/2015 | Rolf | H04L 45/126 709/241 |
| 2015/0204685 A1* | 7/2015 | Gearhart | G01C 21/3614 701/533 |

(Continued)

*Primary Examiner* — Thomas G Black
*Assistant Examiner* — Ana D Thomas
(74) *Attorney, Agent, or Firm* — Alston & Bird LLP

(57) ABSTRACT

A method, apparatus, and computer program product are therefore provided for providing a navigation user interface to a plurality of points of interest. Methods may include receiving an indication of a location; receiving an indication of a category of points of interest; identifying a plurality of points of interest associated with the category; generating point of interest specific routes from the location to each of the plurality of points of interest; identifying portions of the point of interest specific routes that are common to more than one point of interest; generating a plurality of consolidated routes, where multiple points of interest are located along at least one of the plurality of consolidated routes; and providing for presentation of the plurality of consolidated routes, where each of the plurality of consolidated routes is distinguished, based at least in part, on the number of points of interest that are located along the respective consolidated route.

27 Claims, 12 Drawing Sheets

(56) References Cited

U.S. PATENT DOCUMENTS

| | | | |
|---|---|---|---|
| 2016/0069699 A1* | 3/2016 | Chen | G01C 21/3682 |
| | | | 701/426 |
| 2016/0298095 A1* | 10/2016 | Knapp | C12N 9/20 |
| 2016/0370192 A1* | 12/2016 | Maischberger | G01C 21/32 |
| 2016/0370193 A1* | 12/2016 | Maischberger | G01C 21/34 |
| 2017/0016733 A1* | 1/2017 | Rolf | G06F 16/325 |
| 2017/0089707 A1* | 3/2017 | Jehlicka | G08G 1/0112 |
| 2017/0219358 A1* | 8/2017 | Rolf | G01C 21/30 |
| 2017/0268894 A1* | 9/2017 | Rolf | G01C 21/3461 |
| 2017/0322036 A1* | 11/2017 | Gonopolskiy | G01C 21/32 |
| 2017/0322037 A1* | 11/2017 | Gonopolskiy | G01C 21/3667 |
| 2018/0053417 A1* | 2/2018 | Rolf | G08G 1/143 |
| 2018/0174445 A1* | 6/2018 | Rolf | G08G 1/0141 |
| 2018/0259356 A1* | 9/2018 | Rolf | G01C 21/3682 |

\* cited by examiner

METHOD, APPARATUS AND COMPUTER PROGRAM PRODUCT FOR PROVIDING ROUTE GUIDANCE TO MULTIPLE POINTS OF INTEREST

TECHNOLOGICAL FIELD

An example embodiment of the present invention relates generally to providing navigation assistance in the form of route guidance, and more particularly, to a method, apparatus and computer program product for providing a route guidance to a plurality of points of interest.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Navigation systems providing route guidance including dynamic route planning has conventionally been performed from an origin to a destination, and possibly a waypoint. However, such route guidance relies on establishment of a destination. A user may not know exactly where they want to go, and may require some form of assistance in deciding where to go.

BRIEF SUMMARY

A method, apparatus, and computer program product are therefore provided for providing a navigation user interface including route guidance to a plurality of points of interest. A map services provider system may include a memory configured to store map data and point of interest information associated with a plurality of points of interest. The system may also include processing circuitry configured to: receive an indication of a location; receive an indication of a category of points of interest; identify a plurality of points of interest associated with the category; generate point of interest specific routes from the location to each of the plurality of points of interest; identify portions of the point of interest specific routes that are common to more than one point of interest; generate a plurality of consolidated routes, where multiple points of interest are located along at least one of the plurality of consolidated routes; and provide for presentation of the plurality of consolidated routes. Each of the plurality of consolidated routes may be visually distinguished based, at least in part, on the number of points of interest of the plurality of points of interest that are located along the respective consolidated route.

The visual distinction may include at least one of: line weight of a line representing the respective consolidated route; line opacity of a line representing the respective consolidated route, line color of a line representing the respective consolidated route; or numerical identification of the respective consolidated route. The plurality of consolidated routes may be distinguished based, at least in part, on the number of points of interest of the plurality of points of interest that are located along the respective consolidated route, and a weight afforded the points of interest that are located along the respective consolidated route. The weight afforded to the points of interest may be generated according to at least one of: relevance of the respective point of interest to the category of points of interest; popularity of the respective point of interest; user-reviews of the respective point of interest; or user preferences associated with properties of the respective point of interest.

According to some embodiments, the processing circuitry configured to generate a plurality of consolidated routes may include processing circuitry configured to: identify common segments of point of interest specific routes that are shared by two or more point of interest specific routes; and generate a consolidated route including the common segments of at least two point of interest specific routes. The process circuitry configured to generate a plurality of consolidated routes may include processing circuitry configured to: cluster points of interest according to a spatial clustering algorithm to form at least one cluster of at least two points of interest; and generate a consolidated route from the location to the at least one cluster of at least two points of interest, where the consolidated route includes a first segment to a first of the at least two points of interest of the at least one cluster, and a second segment between the first of the at least two points of interest and a second of the at least two points of interest. The processing circuitry may further be configured to provide for navigation assistance from the location along a first consolidated route of the plurality of consolidated routes, where the navigation assistance includes providing a user traveling along the first consolidated route with at least two options for reaching at least two respective points of interest along the first route.

An apparatus may be provided including at least one processor and at least one non-transitory memory including computer program code instructions. The computer program code instructions may be configured to, when executed, cause the apparatus to at least: receive an indication of a location; receive an indication of a category of points of interest; identify a plurality of points of interest associated with the category; generate point of interest specific routes from the location to each of the plurality of points of interest; identify portions of the point of interest specific routes that are common to more than one point of interest; generate a plurality of consolidated routes, where multiple points of interest are located along at least one of the plurality of consolidated routes; and provide for presentation of the plurality of consolidated routes, where each of the plurality of consolidated routes is distinguished based, at least in part, on the number of points of interest that are located along the respective consolidated route.

According to some embodiments, the plurality of consolidated routes are visually distinguished by at least one of: line weight of a line representing the respective consolidated route; line opacity of a line representing the respective consolidated route; line color of a line representing the respective consolidated route; or numerical identification of the respective consolidated routes. Each of the plurality of routes may be visually distinguished based at least in part on the number of points of interest of the plurality of points of interest that are located along the respective consolidated route, and a weight afforded to the points of interest that are located along the respective consolidated route. The weight afforded to the points of interest may be generated according to at least one of: relevance of the respective point of interest to the category of points of interest; popularity of the respective point of interest; user-reviews of the respective point of interest; or user preferences associated with the properties of the respective point of interest.

According to some embodiments, causing the apparatus to generate a plurality of consolidated routes may include causing the apparatus to: identify common segments of point of interest specific routes that are shared by two or more point of interest specific routes; and generate a consolidated route including the common segments of at least two point of interest specific routes. Causing the apparatus to generate a plurality of consolidated routes may include causing the apparatus to: cluster points of interest according to a spatial clustering algorithm to form at least one cluster of at least two points of interest; and generate a consolidated route from the location to at least one cluster of at least two points of interest, where the consolidated route comprises a first segment to a first of the at least two points of interest of the at least one cluster, and a second segment between the first of the at least two points of interest and a second of the at least two points of interest. The apparatus may optionally be configured to provide for navigation assistance from the location along a first consolidated route of the plurality of routes, where the navigation assistance comprises providing a user traveling along the first consolidated route with at least two options for reaching at least two respective points of interest along the first route.

Embodiments of the present invention may provide a computer program product including at least one non-transitory computer-readable storage medium having computer-executable program code instructions stored therein. The computer-executable program code instructions including program code instructions to: receive an indication of a location; receive an indication of a category of points of interest; identify a plurality of points of interest associated with the category; generate point of interest specific routes from the location to each of the plurality of points of interest; identify portions of the point of interest specific routes that are common to more than one point of interest; generate a plurality of consolidated routes, where multiple points of interest are located along at least one of the plurality of consolidated routes; and provide for presentation of the plurality of consolidated routes, where each of the plurality of consolidated routes is distinguished based, at least in part, on the number of points of interest of the plurality of points of interest that are located along the respective consolidated route.

The plurality of consolidated routes may be distinguished visually by at least one of: line weight of a line representing the respective consolidated route; line opacity of a line representing the respective consolidated route; line color of a line representing the respective consolidated route; or numerical identification of the respective consolidated route. Each of the consolidated routes may be distinguished based, at least in part, on the number of points of interest of the plurality of points of interest that are located along the respective consolidated route, and a weight afforded to the points of interest that are located along the respective route. The weight afforded to the points of interest are generated according to at least one of: relevance of the respective point of interest to the category of points of interest; popularity of the respective point of interest; user-reviews of the respective point of interest; or user preferences associated with properties of the respective point of interest.

According to some embodiments, the program code instructions to generate a plurality of consolidated routes may include program code instructions configured to: identify common segments of point of interest specific routes that are shared by two or more point of interest specific routes; and generate a consolidated route including the common segments of at least two point of interest specific routes. The program code instructions to generate a plurality of consolidated routes may include program code instructions to: cluster points of interest according to a spatial clustering algorithm to form at least one cluster of at least two points of interest; and generate a consolidated route from the location to the at least one cluster of at least two points of interest, where the consolidated route includes a first segment to a first of the at least two points of interest of the at least one cluster and a second segment between the first of the at least two points of interest and a second of the at least two points of interest. According to some embodiments, the computer program product may optionally include program code instructions to provide for navigation assistance from the location along the first consolidated route of the plurality of consolidated routes, where the navigation assistance includes providing a user traveling along the first consolidated route with at least two options for reaching at least two respective points of interest along the first consolidated route.

Embodiments of the present invention may provide a method including: receiving an indication of a location; receiving an indication of a category of points of interest; identifying a plurality of points of interest associated with the category; generating point of interest specific routes from the location to each of the plurality of points of interest; identifying portions of the point of interest specific routes that are common to more than one point of interest; generating a plurality of consolidated routes, where multiple points of interest are located along at least one of the plurality of consolidated routes; and providing for presentation of the plurality of consolidated routes, where each of the plurality of consolidated routes is distinguished, based at least in part, on the number of points of interest that are located along the respective consolidated route.

According to some embodiments, the plurality of consolidated routes are distinguished by at least one of: line weight of a line representing the respective consolidated route; line opacity of a line representing the respective consolidated route; line color of a line representing the respective consolidated route; or numerical identification of the respective consolidated route. Each of the plurality of consolidated routes may be distinguished based, at least in part on the number of points of interest of the plurality of points of interest that are located along the respective consolidated route, and a weight afforded to the points of interest that are located along the respective consolidated route. The weight afforded to the points of interest are generated according to at least one of: relevance of the respective point of interest to the category of points of interest; popularity of the respective point of interest; user-reviews of the respective point of interest; or user preferences associated with properties of the respective point of interest.

Generating a plurality of consolidated routes according to some embodiments includes: identifying common segments of point of interest specific routes that are shared by two or more point of interest specific routes; and generating a consolidated route including the common segments of at least two point of interest specific routes. Generating a plurality of consolidated routes may optionally include: clustering points of interest according to a spatial clustering algorithm to form at least one cluster of at least two points of interest; and generating a consolidated route from the location to at least one cluster of at least two points of interest, where the consolidated route includes a first segment to a first of the at least two points of interest of the at least one cluster and a second segment between the first of the at least two points of interest and a second of the at least two points of interest.

BRIEF DESCRIPTION OF THE DRAWINGS

Figure 1:
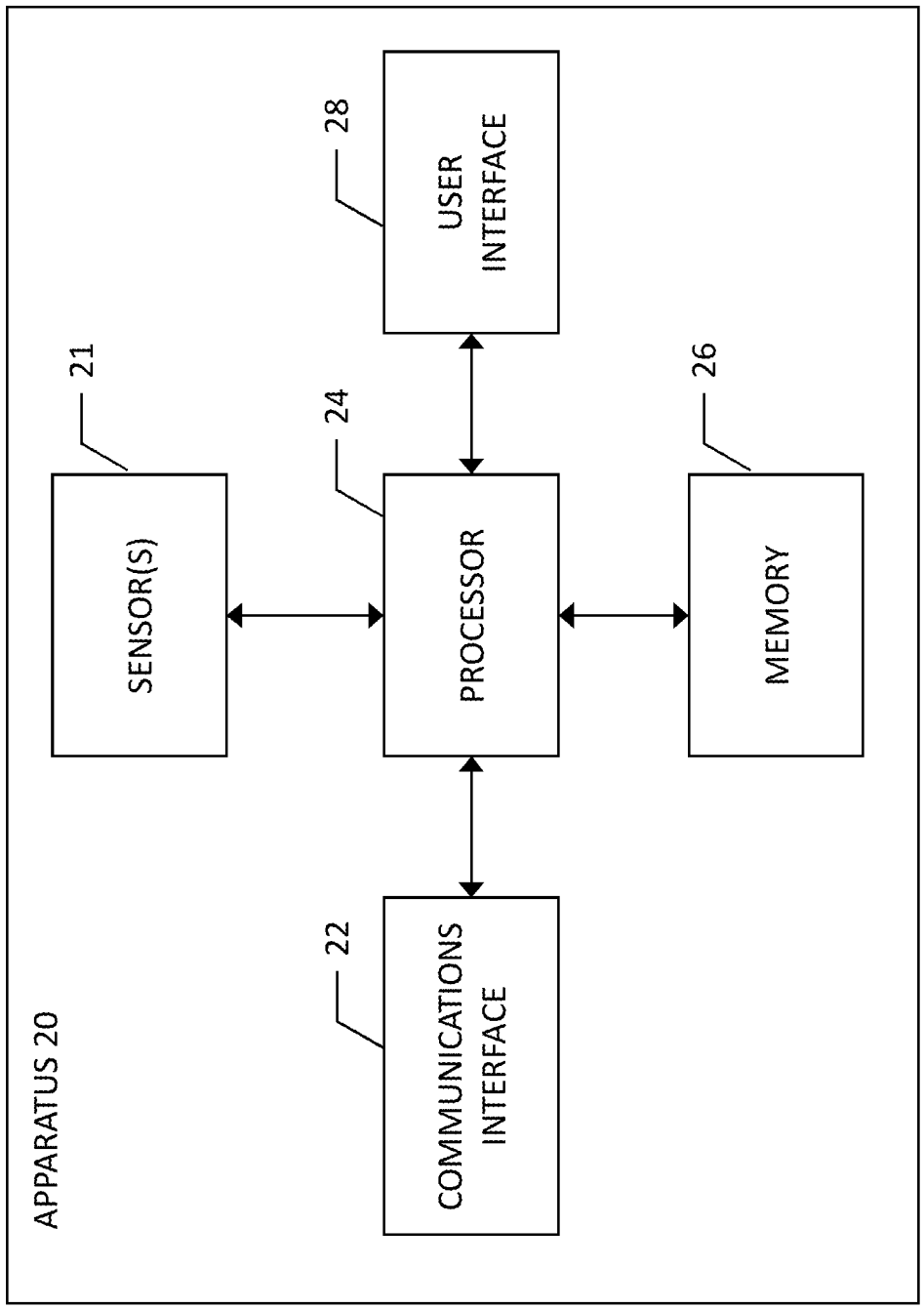
Figure 2:
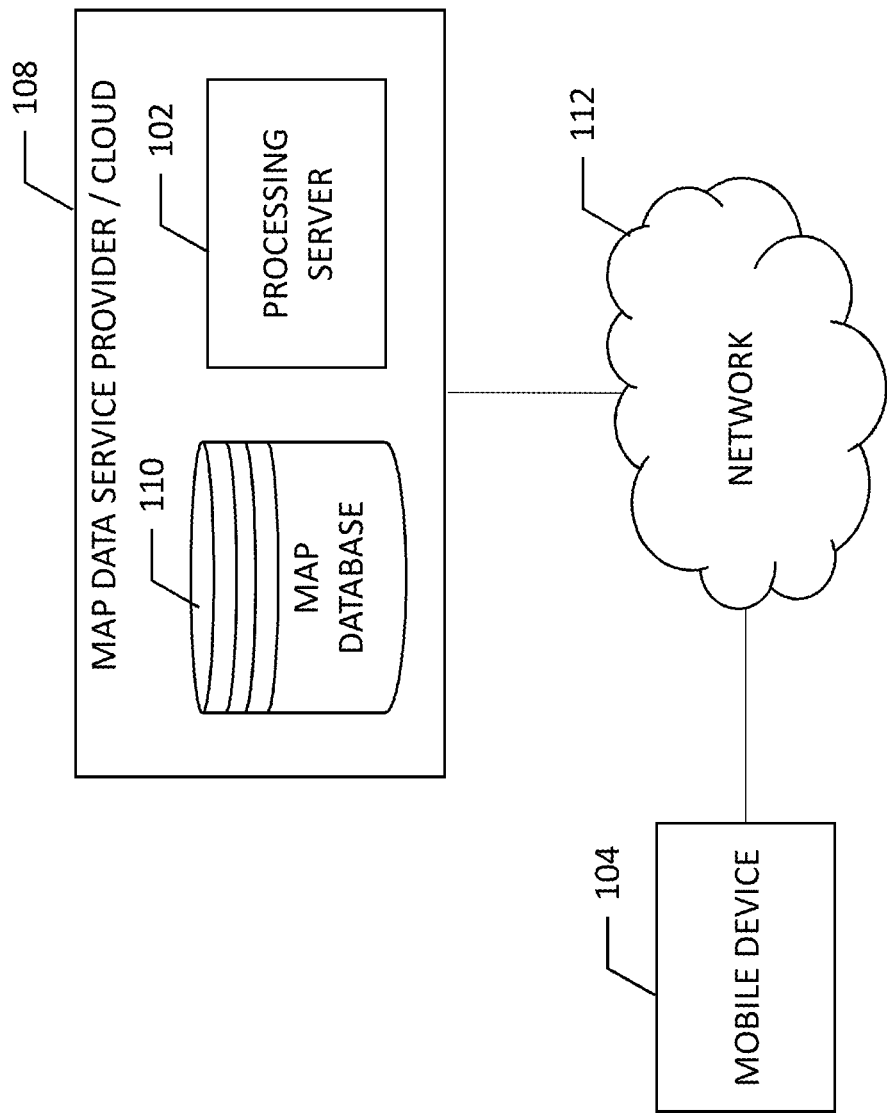
Figure 3:
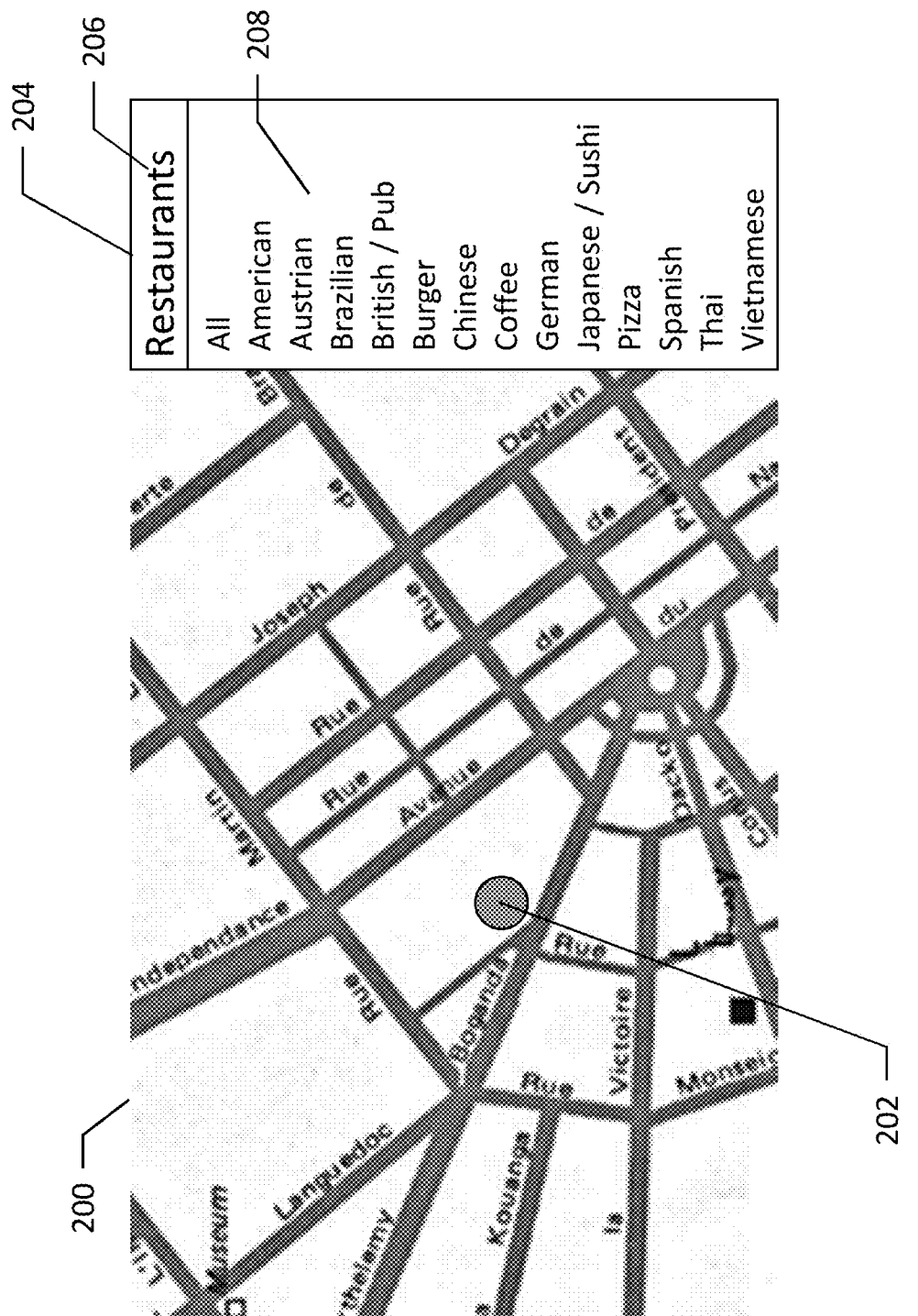
Figure 4:
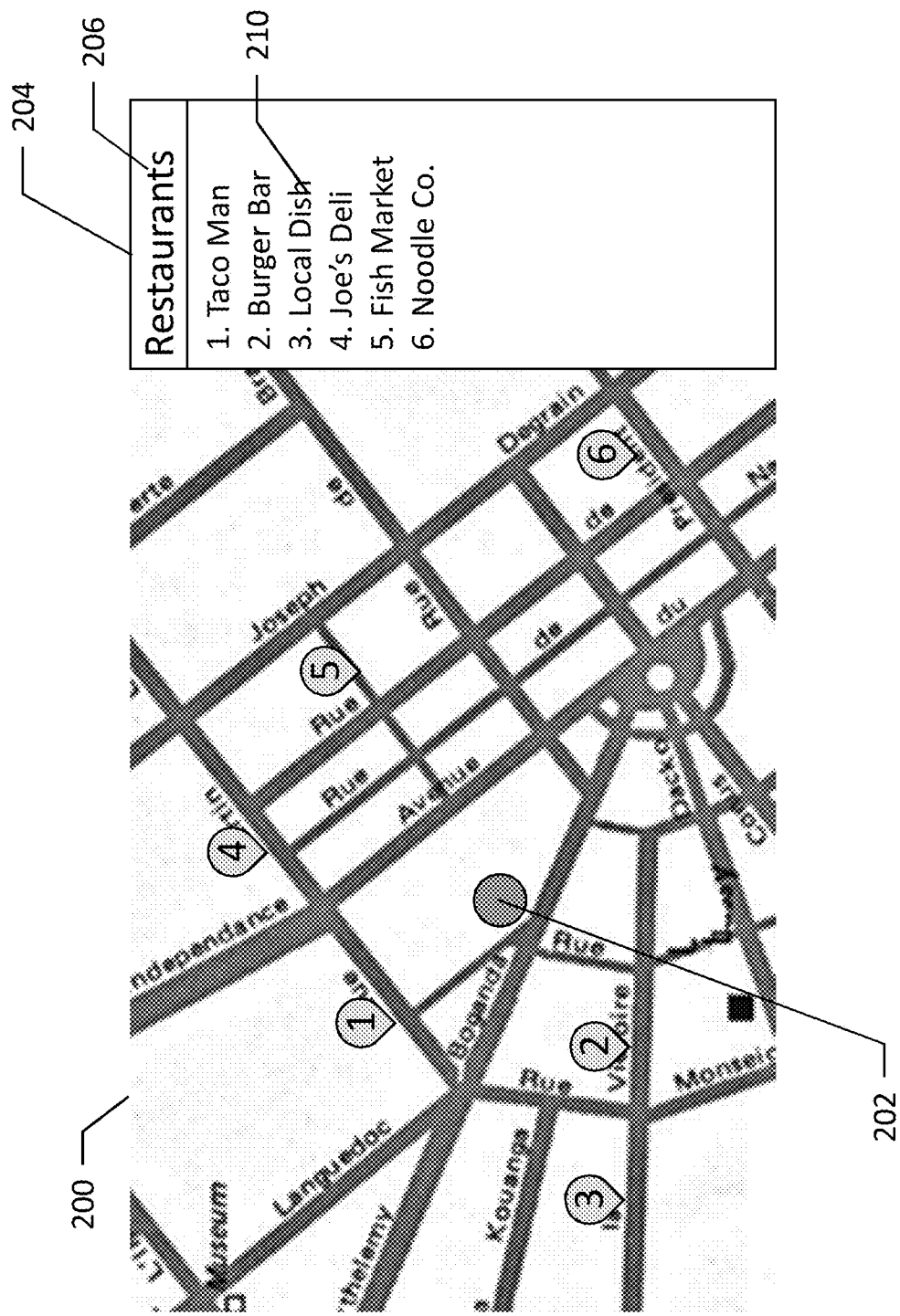
Figure 5:
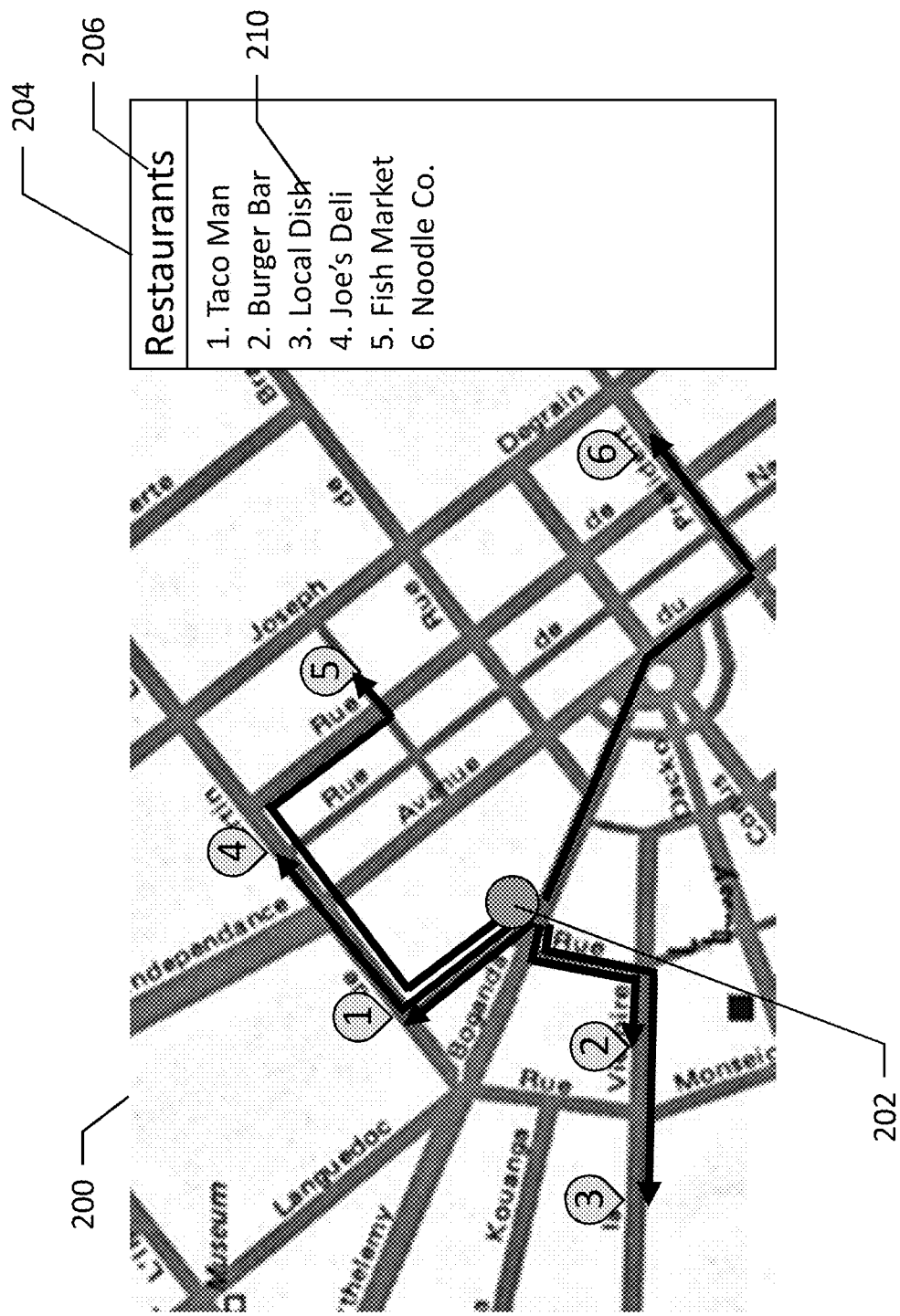

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system of implementing route guidance on a navigation system according to an example embodiment of the present invention;

FIG. 3 is an example user interface for route guidance in a navigation system according to an example embodiment of the present invention;

FIG. 4 is another example user interface for route guidance in a navigation system including presentation of a plurality of points of interest according to an example embodiment of the present invention;

FIG. 5 is an example of a plurality of point of interest specific routes to each of the points of interest presented on a map of a navigation system user interface according to an example embodiment of the present invention.

Figure 6:
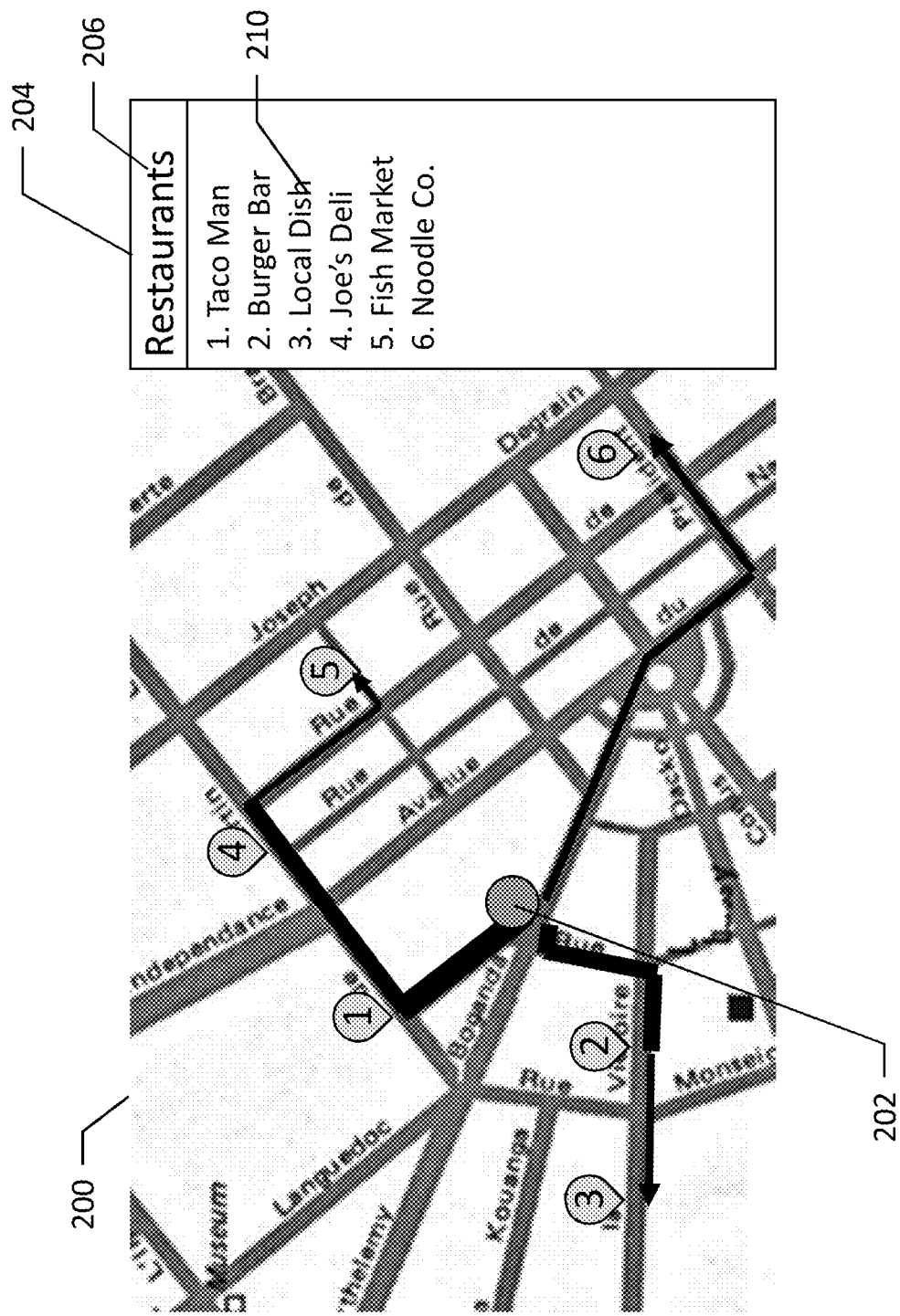
Figure 7:
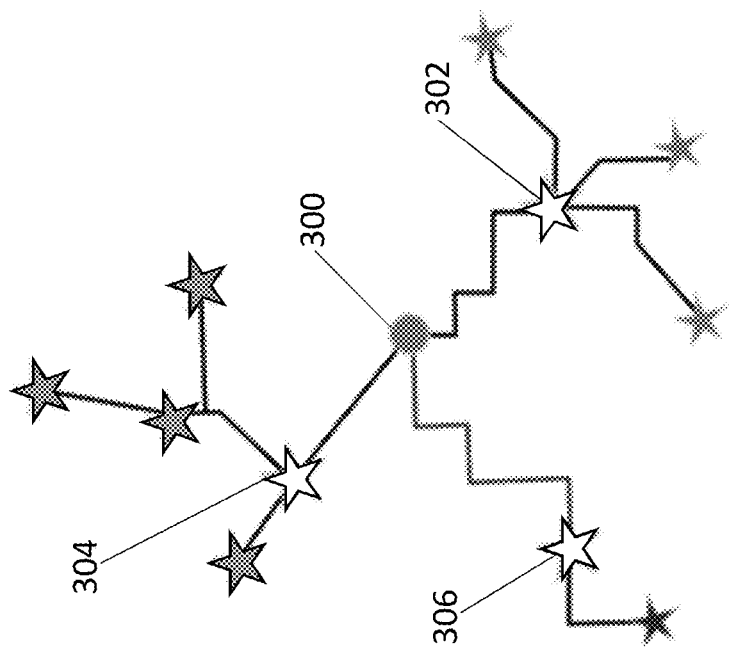
Figure 7:
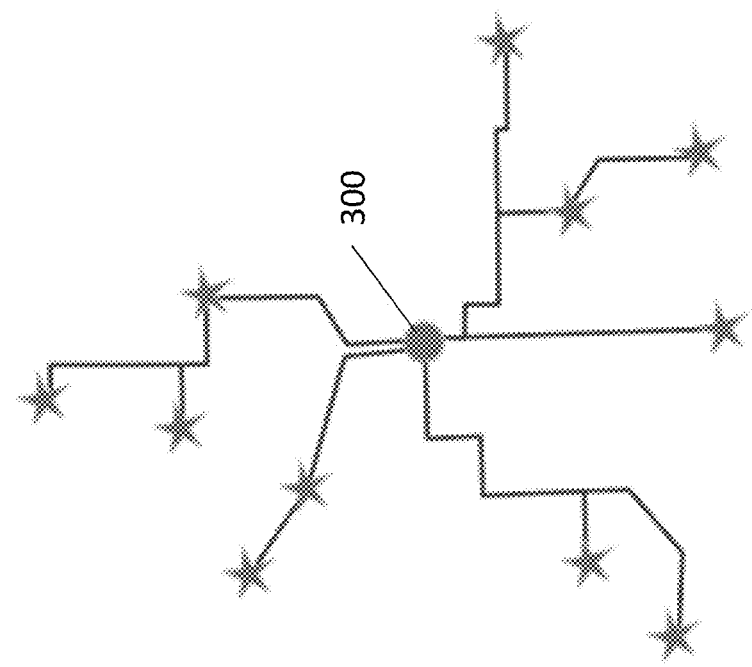
Figure 8:
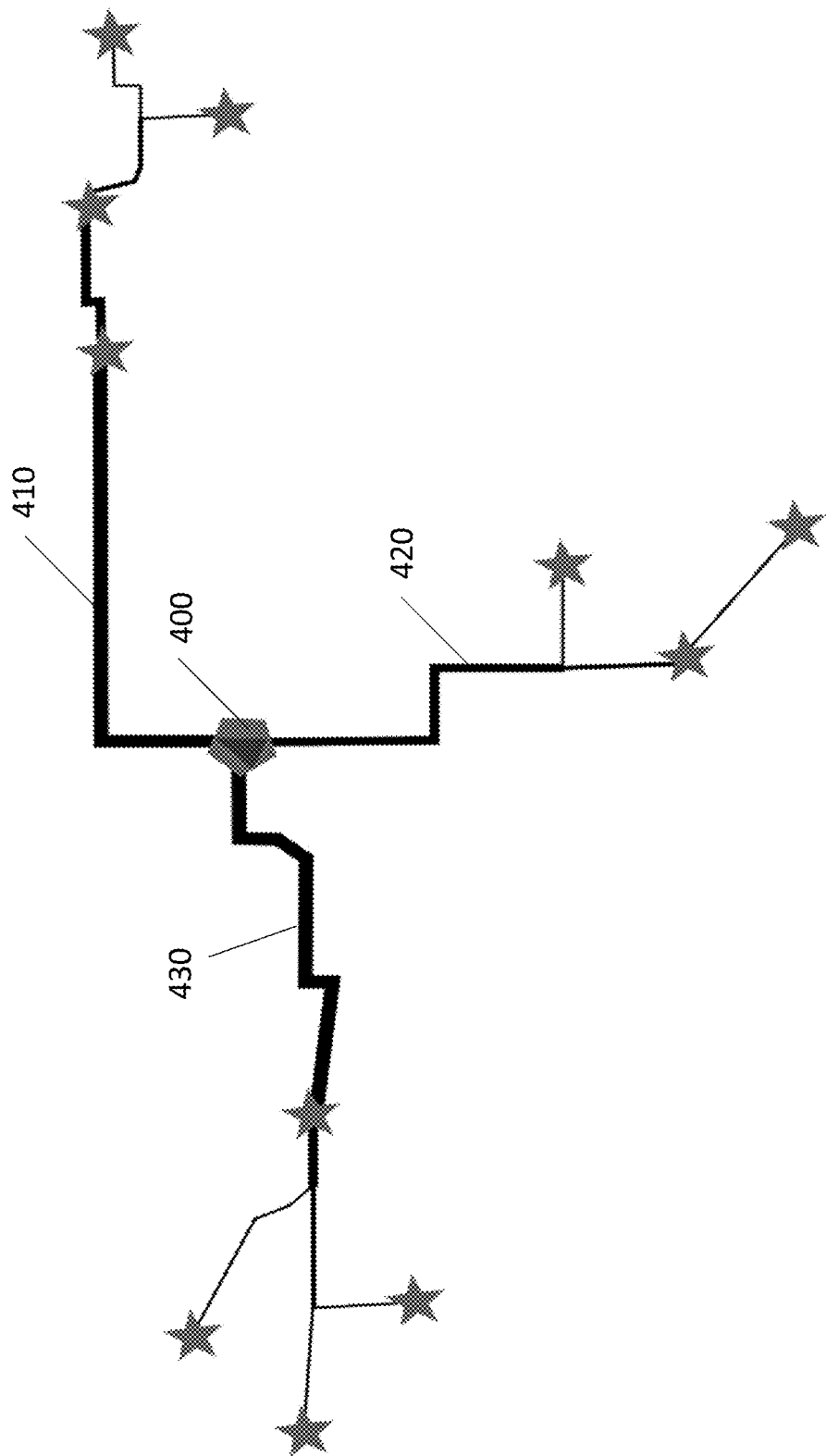
Figure 9:
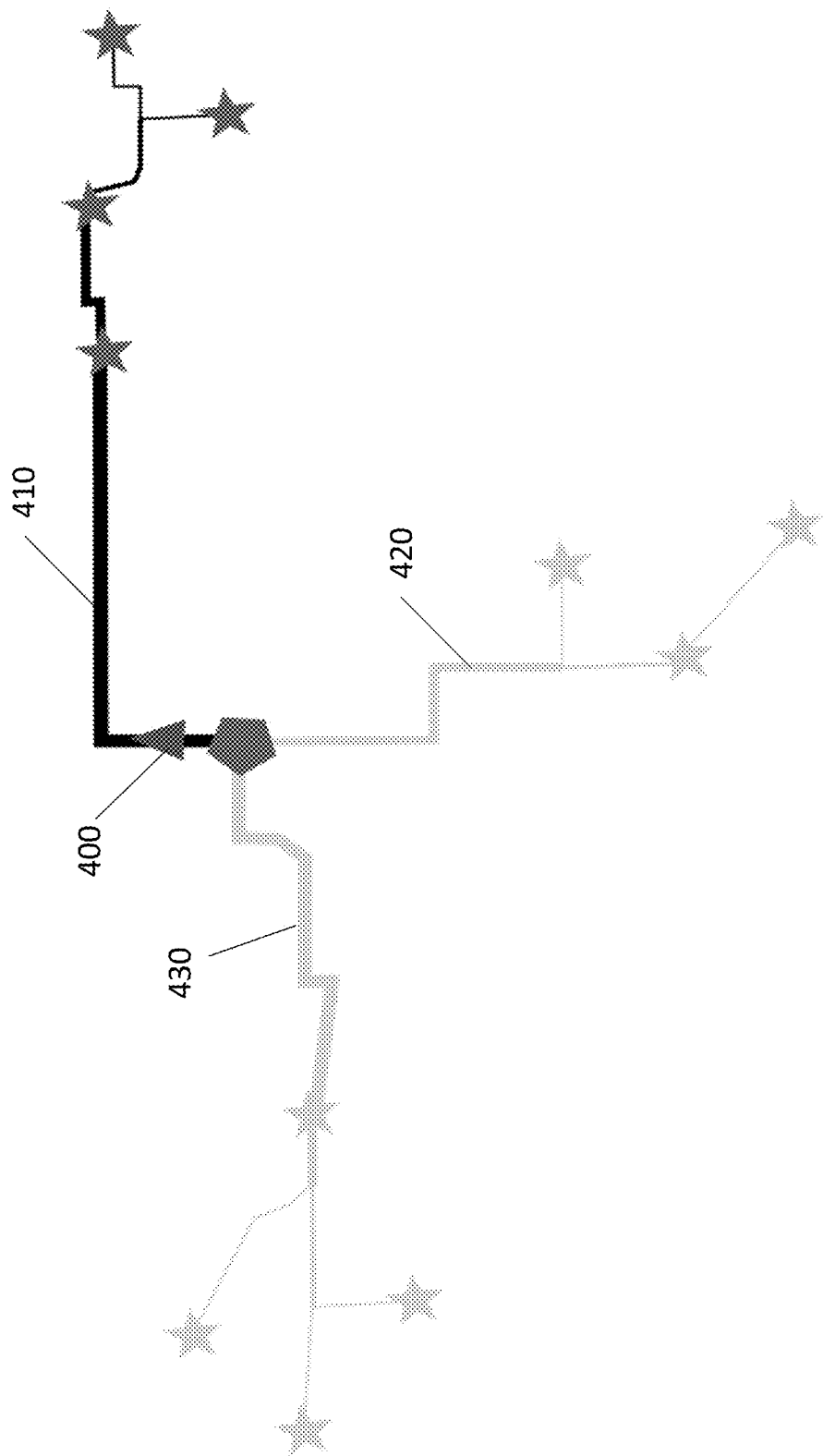
Figure 10:
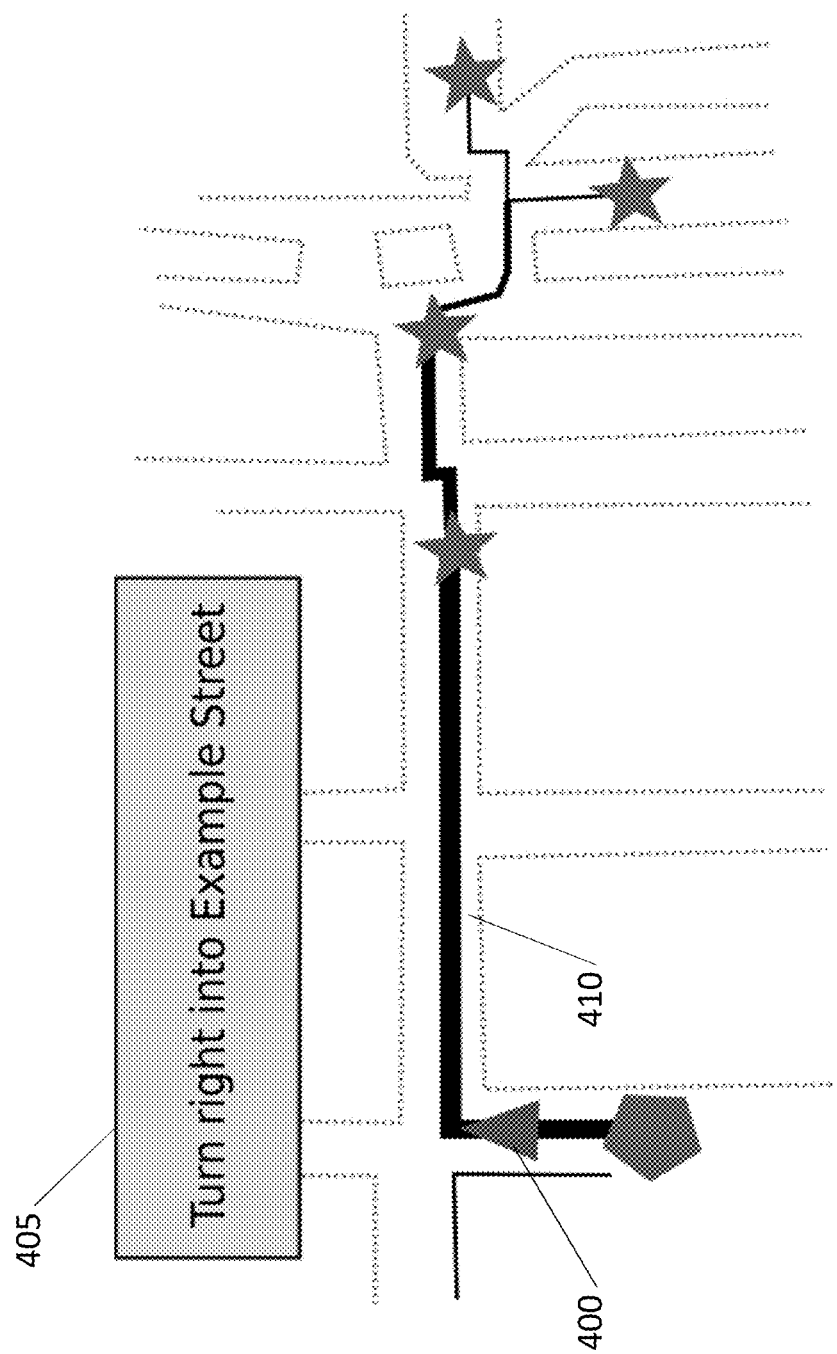
Figure 11:
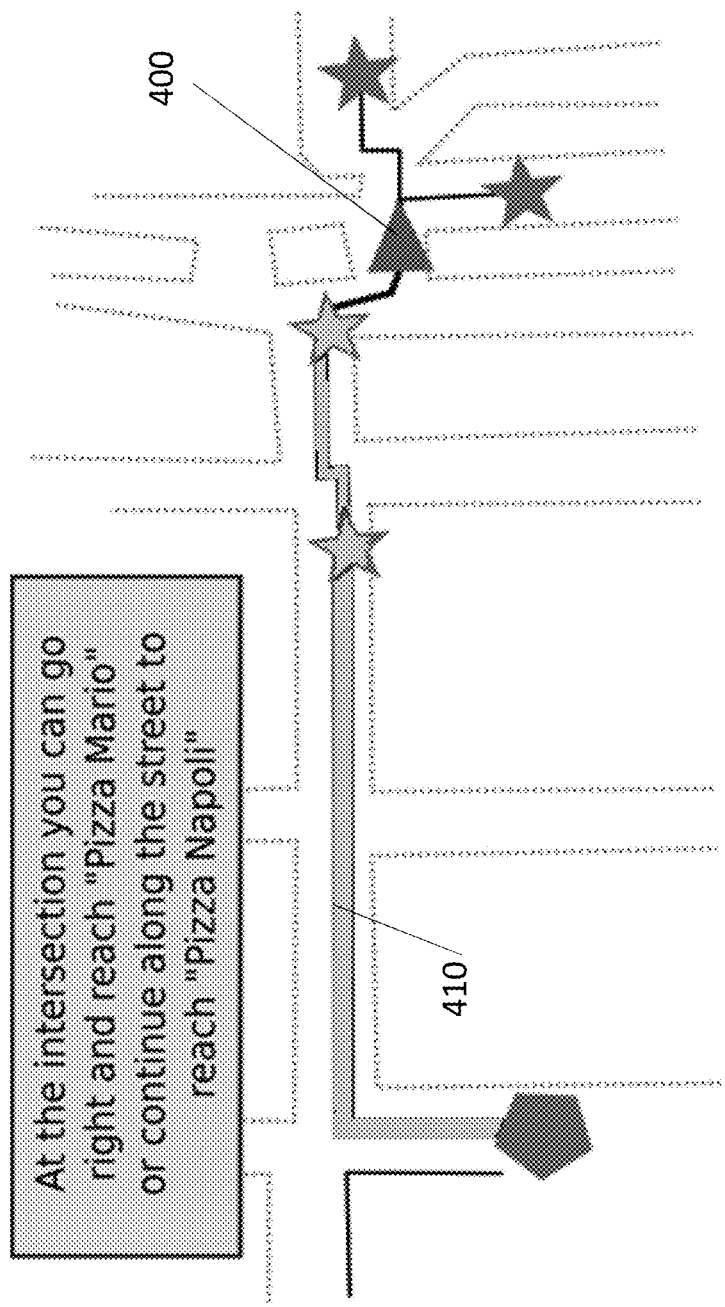
Figure 12:
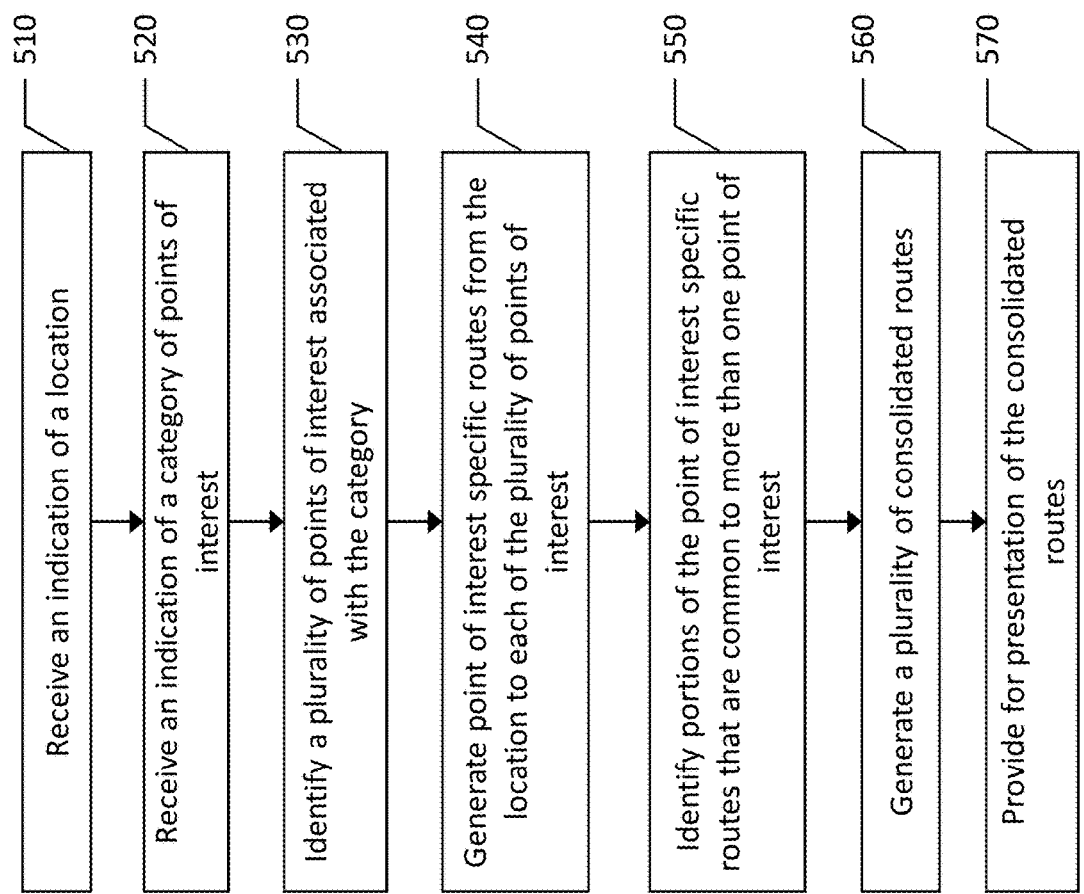

FIG. 6 is an example of two consolidated routes generated from the plurality of point of interest specific routes of FIG. 5 according to an example embodiment of the present invention;

FIG. 7 illustrates clustering of points of interest to form consolidated routes according to an example embodiment of the present invention;

FIG. 8 depicts a plurality of consolidated routes emanating from a user's location according to an example embodiment of the present invention;

FIG. 9 depicts the plurality of consolidated routes once one of the routes has been selected, either actively or passively, by a user according to an example embodiment of the present invention;

FIG. 10 illustrates an enlarged view of a user traveling along a selected consolidated route according to an example embodiment of the present invention;

FIG. 11 illustrates a decision point being reached along the consolidated route of FIG. 10 according to an example embodiment of the present invention; and FIG. 12 is a flowchart illustrating a method of generating a consolidated route for reaching a plurality of points of interest according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing a navigation system user interface. In this regard, a user interface of a device, such a mobile device or a device affixed to a vehicle, such as to a dashboard or the like, may provide navigation assistance to a user. The navigation assistance may provide route guidance from an origin to a plurality of points of interest. The route guidance may provide a current location and information to assist the user, such as turn-by-turn directions from the current location to one or more of the plurality of points of interest.

As described herein, embodiments of the claims may provide a mechanism for enabling a user to encounter a plurality of points of interest while providing an optimal route to maximize the user's exposure to the points of interest. Conventionally, a user provides a location and requests a set of points of interest, possibly belonging to a given category, proximate that location. A user may select one of these points of interest as a destination for which a route may be created. However, in some cases, a user may not want to go directly to a single, specific point of interest, and may wish to visit several points of interest proximate the location. For example, a user visiting Chicago, instead of going directly to a particular restaurant, may want to visit several restaurants before deciding where to eat. The user may want to view the ambiance, crowd level, special menu items, etc., before committing to a single restaurant. Similarly, if a tourist is visiting Rome, Italy, and they want to see historical monuments, statues, and the like, they may not wish to visit only one, but they may want to see as many as possible within their given time frame. In both cases, the user may be interested in having a visual navigation output that indicates which directions or which route is better to take to maximize the user's exposure to the various points of interest that meet the user's criteria (e.g., restaurants or historical monuments).

Embodiments described herein solve this issue using a visualization and navigation technique to display a set of points of interest and routes that lead to them, including routes that lead to pluralities of points of interest. An algorithm to generate the routes may be used to find common segments of routes to each point of interest and aggregating the individual routes into a route that encounters several points of interest. A user may choose a route that reaches a high number of points of interest with the minimal amount of diverting from the route along "branches" or parts of the route that deviate toward one or more points of interest not on the primary route. Embodiments described herein provide a navigation experience to support the presence of multiple destinations and guides a user to a plurality of those destinations using an efficient route.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, a navigation system user interface may be provided to provide route guidance from an origin, along a route to a plurality of destinations or points of interest. Navigation systems may receive an indication of an origin, which may include a current location of a device on which the navigation system is operating (e.g., an in-vehicle navigation system or a mobile device, for example) or a separate location specified by the user, and an indication of a category of point of interest that the user is interested in proximate the location specified. In response to receiving the location and the point of interest category, a plurality of points of interest may be identified. Routes from the location to each of the plurality of points of interest may be calculated based upon available roadways, walkways, etc. These routes may be used, in an algorithm, for example, to generate one or more consolidated routes that encounter two or more of the points of interest. Said differently, two or more of the points of interest may be found along a consolidated route.

A map service provider database may be used to provide route guidance to a navigation system and may be used to consolidate routes to different points of interest. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as points of interest.

The map database may include a database of points of interest and information associated with each point of interest. Information associated with each point of interest may include one or more categories for the point of interest, such as fueling stations, hotels, restaurants, museums, stadiums, offices, auto repair shops, buildings, stores, parks, etc. Information regarding each point of interest may further include sub-categories, such as restaurant type (e.g., pizza, Asian fusion, Italian, etc.). The database may also include or have access to attributes for various points of interest, such as a database of user-reviews, price point of services/products provided, hours of operation, popularity, etc. According to some embodiments, certain points of interest may be promoted or sponsored through advertising in order to influence the ranking of the point of interest on a list of points of interest that are presented to a user. The map database 110 can include data about the POIs and their respective locations in the point of interest records. The map database 110 may include data about places, such as cities, towns, or other communities, and other geographic features such as bodies of water, mountain ranges, etc. Such place or feature data can be part of the point of interest data or can be associated with points of interest or point of interest data records (such as a data point used for displaying or representing a position of a city). In addition, the map database 110 can include event data (e.g., traffic incidents, construction activities, scheduled events, unscheduled events, etc.) associated with the point of interest data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as in a vehicle's head unit, infotainment unit, or an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

Example embodiments provided herein provide a new mechanism for establishing a route along which multiple points of interest fall. This enables a user to select a route based on the number or preferences of points of interest rather than having to select a single point of interest as a singular destination.

According to an example embodiment, a user of a device, such as a navigation system in a vehicle or a mobile device 104 may enter an origin or a first location. This first location is selected as the location proximate which points of interest are desired. The user may then select a category for points of interest. For example, the user may be looking for a restaurant such that the point of interest category of "restaurant" is selected. If the user is looking for a specific type of restaurant or a specific price point, the user may enter this information as a sub-category of the type of point of interest.

FIG. 3 illustrates an example embodiment of a user interface depicting a map 200, which may be presented on a display, such as a display of user interface 28 of apparatus 20. The illustrated embodiment includes the first location 202, which may be a present location of a user or another location selected by a user. The illustrated embodiment further includes a selection area 204 that includes a selected point of interest category 206, and presents a plurality of sub-categories 208. The selected point of interest category 206 is a "restaurant" while the sub-categories 208 include a plurality of types of cuisine. Optionally, a user may select other properties of restaurants (or other points of interest) as sub-categories exclusive of, or in addition to, the cuisine type, such as price point, atmosphere (family friendly vs. couples), etc.

When a selection is made with respect to a point of interest category, and if desired, one or more sub-categories, the points of interest proximate the first location 202 that are within that category (and possibly sub-category) may be established by the map data service provider 108, for example. FIG. 4 illustrates a plurality of points of interest that are presented proximate the first location 202 in response to a selection of a point of interest category 206 of "Restaurants". While there may be no limit to the number of points of interest displayed, the depicted embodiment includes five points of interest meeting the category requirement 206 within the displayed portion of the map 200. Those five points of interest are listed in list 210 and depicted on the map by indicators 1 through 5. Example embodiments may or may not include a list 210, and may or may not include identifiers associating the points of interest on the map with points of interest in the list 210. Embodiments may include simple indicators without numbers or any indication of the identity of the point of interest, but only indicate that a point of interest meeting the category criteria is present at the illustrated location.

According to some embodiments, a user may remove points of interest from the list of points of interest. For example, according to the embodiment of FIG. 4, the user may not be interested in a certain type of cuisine in the list of restaurants 210, such that the user may remove the point of interest from the list. This may be done by a selection of the point of interest on the map 200 or on the list 210, and performing an operation (e.g., swipe or menu selection) to eliminate that point of interest from the map 200 and/or list 210.

Once the points of interest have been established, routes to each of the points of interest may be generated, as illustrated in FIG. 5. As shown, routes are generated from the location 202 to each of the points of interest, one through six. These routes may be generated according to shortest distance, shortest time to destination, or any type of route planning which may be informed by user preferences that the user has established with the navigation system or map services provider. As shown, some segments of the routes may be overlapping. For example, the routes to points of interest two and three are very similar, but the route to point of interest three continues further along the final road segment. Similarly, the routes to points of interest one, four, and five include a common initial segment. The route to point of interest six shares no segments with any other routes.

According to example embodiments, when all routes to the points of interest have been generated, common segments of the routes that are shared by two or more routes are identified. These common segments may be identified or labelled with the point of interest that can be reached by traversing the common segment. Following identification of shared segments, a weighting formula may be applied to the routes and the common segments of routes. The weighting formula may consider criteria such as the number of point of interest routes that share a particular segment, the relevance and characteristics of the corresponding points of interest (detailed further below), the presence of particular attributes on the segments (e.g., pedestrian area, panoramic route, etc.) and so on. Portions of routes that are not shared between more than one destination may be evaluated as leading to a single point of interest.

The routes to the points of interest, their common segments, and the weighting formula applied thereto is used to generate one or more consolidated routes, where each consolidated route is a route that includes at least two of the points of interest along said route. The consolidated routes may be calculated or generated by, for example, the processing server 102 of the map data service provider 108, or may be generated on the mobile device 104 using, for example, processor 24. Once the consolidated routes are generated, the result is provided for presentation on a map, such as the map 200 of user interface 28.

A map presented on a user interface may be moved and zoomed in order to focus or re-focus the presented portion of the map on the area of the map in which the points of interest are located. Icons for each point of interest and an icon for the start point may be added to the map. FIG. 6 illustrates an example embodiment of the display of available consolidated routes. As shown, two consolidated routes were generated from the five separate point of interest specific routes, while the route to point of interest six remains independent as no other points of interest shared any segment of the route to point of interest six. The two consolidated routes each have two or more points of interest along them. A first consolidated route begins at the first location 202, and moves toward point of interest one. It then goes on to point of interest 4, and continues to point of interest five. A second consolidated route begins at the first location 202, and advances toward point of interest two, then continues on to point of interest three.

The consolidated routes may be distinguished based on characteristics of the consolidated routes. For example, the more points of interest that are accessible by a portion of a route may be indicated by a line weight of the route portion, an opacity of the route portion, or a color of the route portion, for example. As shown in FIG. 6, the route portion from the first location 202 to point of interest one may be of a very heavy line weight, as three points of interest are accessible via that portion of the route. After passing point of interest one, the route may be of a lighter weight as only two additional points of interest are accessible via the route portion between point of interest one and point of interest four. The route portion between point of interest four and point of interest five is lighter still since only one additional point of interest is accessible via this route portion. Similarly, the route portion from the first location to point of interest two is of a relatively heavy weight as compared to the route portion between point of interest two and point of interest three, along which only one point of interest is accessible. The line weights may vary based on the number of points of interest accessible via a respective portion of the route. The thickest line translating in this embodiment to maximizing the probability of finding interesting or desirable points of interest without having to branch out through different routes. As the route to point of interest six only includes a single destination, the line weight for the route is uniform and of a relatively light weight.

Embodiments described herein may provide a mechanism for generating consolidated routes that uses a clustering algorithm in addition to, or in place of the aforementioned algorithm using overlapping route portions. Spatial clustering of points of interest using a spatial clustering algorithm can be used to create consolidated routes to a plurality of points of interest, creating an initial, common route between the first location and the points of interest. In a clustering algorithm embodiment, points of interest may be grouped together according to a clustering algorithm, using their coordinates on the map as features. For each cluster, the point of interest closest to the first location is found and used as the "reference point of interest" for the cluster. Routes from the first location to the reference point of interest may then be established, and routes to each other point of interest in the cluster may be established from the reference point of interest in the cluster.

FIG. 7 illustrates an example embodiment of generating consolidated routes using clustering of the points of interest. Diagram A of FIG. 7 illustrates a plurality of points of interest, represented by stars, where each point of interest includes a separate point of interest specific route from the source 300, with some routes overlapping with others. Diagram B of FIG. 7 illustrates the result of a clustering algorithm to group together clusters of points of interest, each cluster having a closest point of interest (302, 304, 306) to the source 300. A consolidated route for each cluster is generated having a first route portion that is between the source 300 and the respective closest point of interest 302, 304, or 306. The consolidated route continues from the respective closes point of interest to one or more points of interest in the cluster for the consolidated route.

The selection of points of interest is made according to the input of a user and may include additional filtering, such as open hours (e.g., if the point of interest is open when the search is conducted), price point, rating (e.g., from a rating agency or from crowd-sourced ratings), and other potential criteria. The points of interest may then be ranked according to predetermined functions that take into account a set of features or properties associated with each point of interest. The points of interest may also be influenced according to sponsored points of interest, such as a new business for which an owner is promoting the new business through advertising. A sponsored point of interest may be more prominently displayed or ranked. The result of this process is a list of points of interest, each having a score corresponding to a level of interest. The level of interest score for each point of interest may be factored in to the generation of a consolidated route. For example, a consolidated route including points of interest with high level of interest scores may be prioritized, and may sacrifice conciseness of the route or directness of the route in favor of points of interest with a high level of interest.

Once one or more consolidated routes have been generated to include a plurality of points of interest, a user may select a consolidated route as the route they wish to take, such that a navigation phase may be initiated in which route guidance is provided to the user to follow the consolidated route. In some example embodiments, a consolidated route may not be proactively selected by a user such as by selecting the route on a user interface, and the user may simply begin to traverse the consolidated route. The consolidated route chosen may optionally be established without a user input selection based on the path taken by the user once the path becomes distinct from any other consolidated routes. For example, once the consolidated routes have been established, a user may simply proceed toward or along one of the consolidated routes. As the user advances toward or along their chosen route, their position and/or heading may be determined, such as by GPS, accelerometer, signal strength measurements, or the like, and their location or heading may be correlated with one of the consolidated routes to establish the selected route. Once the desired consolidated route is established, the route guidance may provide information and maneuvers using one or both of a voice and graphical user interface. The route guidance along a consolidated route may go beyond conventional route guidance to support a multiple destination scenario.

Once a consolidated route to multiple points of interest is selected, a user interface may provide for display a map including the points of interest and the route to reach each of the points of interest, which may include branches that emanate from a primary route to one or more destinations on a "branch" of the route, where the primary route is the route by which the most points of interest may be reached. Contrary to conventional route guidance, a user does not need to select a single destination or single point of interest. The user can decide which points of interest are desirable and make decisions regarding a direction and route to take, whether it is a branch or a primary route, to reach one or more points of interest.

In response to a user proceeding along a consolidated route, the location of the user is established (e.g., by a global positioning system or the like), and the location is map-matched to the consolidated route of the map. The route guidance may then commence with voice and/or graphical information to inform the user of upcoming maneuvers, such as turns, required to remain on the route. Distinct from conventional route guidance, with multiple points of interest accessible through branches of the consolidated route, decision points are included in the consolidated route where a user must decide which portion of the consolidated route to follow. Decision points are locations along the consolidated route where the route splits into at least two different branches leading to different points of interest or clusters of points of interest. The user may not need to provide any user input to select a branch of the consolidated route, but instead proceeds along the desired branch. The user's location may be used to establish which portion or branch of the consolidated route the user has elected to traverse. Once the decision of the user has been established, points of interest along portions of the consolidated route that are not accessible via the user's current path may be discarded. For example, if a user passes a branch to a certain point of interest and continues along the primary route toward additional points of interest, that certain point of interest may be discarded. Discarded points of interest and the branches of the route to reach them may not be removed from the presentation of the map, but may be made semi-transparent to indicate a lower level of significance.

FIG. 8 illustrates an example embodiment where a user has sought points of interest of a certain type, and consolidated routes 410, 420, and 430, are presented emanating from the user's location 400. The user may proceed along one of the consolidated routes 410 as illustrated in FIG. 9, whereupon the remaining routes 420 and 430 that were not selected (either actively or by virtue of the user's direction of travel) are discarded or rendered in a more transparent presentation. The discarded routes may be depicted in a variety of manners, such as "grayed-out" or otherwise distinguished from the route chosen.

As a user proceeds along a consolidated route without decision points, guidance may be provided in a conventional route-guidance fashion. FIG. 10 illustrates an enlarged version of route 410 from FIG. 9, where the user is proceeding along the route. The user interface may zoom in to the chosen consolidated route upon selection of the route as shown in FIG. 10. As the user is proceeding along route 410, each of the points of interest are accessed by the same initial portion of the route. Thus, the route guidance may provide an indication to the user to follow the portion of the route that lacks decision points in a conventional manner. Those route guidance instructions may be voice commands, graphical commands, and/or text commands as shown at 405.

As a user is approaching a decision point along a route, the upcoming decision may be communicated to a user through one or more of audible or visual indications. FIG. 11 illustrates such an example, where the user 400 has reached a decision point, where the user can turn right and reach "Pizza Mario" or continue straight and reach "Pizza Napoli." This information to help the user make the decision at the decision point may be communicated through voice, text, and/or other graphical illustrations.

Embodiments of the present invention may go beyond navigation and route guidance and may provide additional information to a user. For example, when a user is within the vicinity of a point of interest, an alert may indicate to the user that they are approaching the point of interest and advise the user of the maneuvers required to reach the point of interest. The vicinity may be established based on a user's traveling speed to afford the user sufficient time to make a decision, and/or the vicinity may be established based on a distance away from the point of interest. The degree of additional information provided to a user may be user-configurable according to user preferences to include more or less information as desired. For example, as a user approaches a point of interest, example embodiments may provide an indication of the point of interest, along with any relevant information such as a "star rating" (e.g., user reviews, professional reviews), a degree of how busy the point of interest is, or other information that may help a user make a decision regarding the point of interest.

As a user approaches a point of interest, embodiments may also provide an indication to a user of how many other points of interest remain along the route. For example, the user interface may provide an indication of the point of interest that the user is approaching, and also note that there are five additional points of interest further along the consolidated route if the user elects to bypass the current point of interest.

A user may deviate from a consolidated route, whereupon they may be directed back to the consolidated route according to a conventional "re-routing" route guidance mechanism. However, according to some example embodiments described herein, once a user travels a certain predefined distance off of the consolidated route, it may be determined that the user is no longer interested in that consolidated route. Example embodiments may, upon discarding the prior consolidated route, conduct a new search and generate new consolidated routes from the current location of the user, providing new opportunities and consolidated routes for the user to reach points of interest, which may include some points of interest from the prior consolidated route, or may be an entirely new set of points of interest.

FIG. 12 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 12 illustrates a method for providing a user interface for route guidance in a navigation system. As shown at 510, an indication of a location may be received. The location may be the current location of a user, or the location may be user selected for a potential future user location. A category of points of interest may be received at 520. The category may include a type of point of interest, such as restaurant, museum, retail store, or the like. At 530, a plurality of points of interest fitting the category or approximately fitting the category may be established. From the indicated location, a point of interest specific route may be generated to each of the points of interest at 540. From among the plurality of point of interest specific routes, portions of those routes that are common to more than one route may be identified at 550. From these point of interest specific routes and common portions, a plurality of consolidated routes may be generated at 560, where the consolidated routes are routes emanating from the indicated location to encounter a plurality of the points of interest. The consolidated routes may be provided for presentation, such as on a navigation system user interface, at 570.

In an example embodiment, an apparatus for performing the method of FIG. 12 above may comprise a processor (e.g., the processor 24) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory configured to store map data and point of interest information associated with a plurality of points of interest; and
processing circuitry configured to:
receive an indication of a location;
receive an indication of a category of points of interest;
identify a plurality of points of interest associated with the category;

generate point of interest specific routes from the location to each of the plurality of points of interest;
identify portions of the point of interest specific routes that are common to more than one point of interest;
generate a plurality of consolidated routes, wherein multiple points of interest are located along at least one of the plurality of consolidated routes; and
provide for presentation of the plurality of consolidated routes, wherein each of the plurality of consolidated routes is presented with a visual characteristic indicative of the number of points of interest of the plurality of points of interest that are located along the respective consolidated route, and wherein the visual characteristic of each of the plurality of consolidated routes changes as the respective consolidated route passes each point of interest along the respective consolidated route to reflect a percentage of points of interest remaining along the respective consolidated route.

2. The system of claim 1, wherein the plurality of consolidated routes are distinguished by at least one of: line weight of a line representing the respective consolidated route; line opacity of a line representing the respective consolidated route; line color of a line representing the respective consolidated route; or numerical identification of the respective consolidated routes.

3. The system of claim 1, wherein each of the plurality of consolidated routes are distinguished based, at least in part on the number of points of interest of the plurality of points of interest that are located along the respective consolidated route, and a weight afforded to the points of interest that are located along the respective consolidated route.

4. The system of claim 3, wherein the weight afforded to the points of interest are generated according to at least one of: relevance of the respective point of interest to the category of points of interest; popularity of the respective point of interest; user-reviews of the respective point of interest; or user preferences associated with properties of the respective point of interest.

5. The system of claim 1, wherein the processing circuitry configured to generate a plurality of consolidated routes comprises processing circuitry configured to:
cluster points of interest according to a spatial clustering algorithm to form at least one cluster of at least two points of interest; and
generate a consolidated route from the location to the at least one cluster of at least two points of interest, wherein the consolidated route comprises a first segment to a first of the at least two points of interest of the at least one cluster, and a second segment between the first of the at least two points of interest and a second of the at least two points of interest.

6. The system of claim 1, wherein the processing circuitry is further configured to:
provide for navigation assistance from the location along a first consolidated route of the plurality of consolidated routes, wherein the navigation assistance comprises providing a user traveling along the first consolidated route with at least two options for reaching at least two respective points of interest along the first route.

7. The mapping system of claim 1, wherein the visual characteristic of each of the plurality of consolidated routes comprises a line weight, wherein the line weight is reduced as the respective consolidated route passes each point of interest along the respective consolidated route.

8. An apparatus comprising at least one processor and at least one non-transitory memory including computer program code instructions, the computer program code instructions configured to, when executed, cause the apparatus to at least:
receive an indication of a location;
receive an indication of a category of points of interest;
identify a plurality of points of interest associated with the category;
generate point of interest specific routes from the location to each of the plurality of points of interest;
identify portions of the point of interest specific routes that are common to more than one point of interest;
generate a plurality of consolidated routes, wherein multiple points of interest are located along at least one of the plurality of consolidated routes; and
provide for presentation of the plurality of consolidated routes, wherein each of the plurality of consolidated routes is presented with a visual characteristic indicative of the number of points of interest of the plurality of points of interest that are located along the respective consolidated route, and wherein the visual characteristic of each of the plurality of consolidated routes changes as the respective consolidated route passes each point of interest along the respective consolidated route to reflect a percentage of points of interest remaining along the respective consolidated route.

9. The apparatus of claim 8, wherein the plurality of consolidated routes are distinguished by at least one of: line weight of a line representing the respective consolidated route; line opacity of a line representing the respective consolidated route; line color of a line representing the respective consolidated route; or numerical identification of the respective consolidated routes.

10. The apparatus of claim 8, wherein each of the plurality of consolidated routes are distinguished based, at least in part on the number of points of interest of the plurality of points of interest that are located along the respective consolidated route, and a weight afforded to the points of interest that are located along the respective consolidated route.

11. The apparatus of claim 10, wherein the weight afforded to the points of interest are generated according to at least one of: relevance of the respective point of interest to the category of points of interest; popularity of the respective point of interest; user-reviews of the respective point of interest; or user preferences associated with properties of the respective point of interest.

12. The apparatus of claim 8, wherein causing the apparatus to generate a plurality of consolidated routes comprises causing the apparatus to:
identify common segments of point of interest specific routes that are shared by two or more point of interest specific routes; and
generate a consolidated route including the common segments of at least two point of interest specific routes.

13. The apparatus of claim 8, wherein causing the apparatus to generate a plurality of consolidated routes comprises causing the apparatus to:
cluster points of interest according to a spatial clustering algorithm to form at least one cluster of at least two points of interest; and
generate a consolidated route from the location to the at least one cluster of at least two points of interest, wherein the consolidated route comprises a first segment to a first of the at least two points of interest of the at least one cluster, and a second segment between the first of the at least two points of interest and a second of the at least two points of interest.

14. The apparatus of claim 8, wherein the apparatus is further caused to:
provide for navigation assistance from the location along a first consolidated route of the plurality of routes, wherein the navigation assistance comprises providing a user traveling along the first consolidated route with at least two options for reaching at least two respective points of interest along the first route.

15. A computer program product comprising at least one non-transitory computer-readable storage medium having computer-executable program code instructions stored therein, the computer-executable program code instructions comprising program code instructions to:
receive an indication of a location;
receive an indication of a category of points of interest;
identify a plurality of points of interest associated with the category;
generate point of interest specific routes from the location to each of the plurality of points of interest;
identify portions of the point of interest specific routes that are common to more than one point of interest;
generate a plurality of consolidated routes, wherein multiple points of interest are located along at least one of the plurality of consolidated routes; and
provide for presentation of the plurality of consolidated routes, wherein each of the plurality of consolidated routes is presented with a visual characteristic indicative of the number of points of interest of the plurality of points of interest that are located along the respective consolidated route, and wherein the visual characteristic of each of the plurality of consolidated routes changes as the respective consolidated route passes each point of interest along the respective consolidated route to reflect a percentage of points of interest remaining along the respective consolidated route.

16. The computer program product of claim 15, wherein the plurality of consolidated routes are distinguished by at least one of: line weight of a line representing the respective consolidated route; line opacity of a line representing the respective consolidated route; line color of a line representing the respective consolidated route; or numerical identification of the respective consolidated routes.

17. The computer program product of claim 15, wherein each of the plurality of consolidated routes are distinguished based, at least in part on the number of points of interest of the plurality of points of interest that are located along the respective consolidated route, and a weight afforded to the points of interest that are located along the respective consolidated route.

18. The computer program product of claim 17, wherein the weight afforded to the points of interest are generated according to at least one of: relevance of the respective point of interest to the category of points of interest; popularity of the respective point of interest; user-reviews of the respective point of interest; or user preferences associated with properties of the respective point of interest.

19. The computer program product of claim 15, wherein the program code instructions configured to generate a plurality of consolidated routes comprise program code instructions to:
identify common segments of point of interest specific routes that are shared by two or more point of interest specific routes; and
generate a consolidated route including the common segments of at least two point of interest specific routes.

20. The computer program product of claim 15, wherein the program code instructions to generate a plurality of consolidated routes comprise program code instructions to:
cluster points of interest according to a spatial clustering algorithm to form at least one cluster of at least two points of interest; and
generate a consolidated route from the location to the at least one cluster of at least two points of interest, wherein the consolidated route comprises a first segment to a first of the at least two points of interest of the at least one cluster, and a second segment between the first of the at least two points of interest and a second of the at least two points of interest.

21. The computer program product of claim 15, further comprising program code instructions to:
provide for navigation assistance from the location along a first consolidated route of the plurality of consolidated routes, wherein the navigation assistance comprises providing a user traveling along the first consolidated route with at least two options for reaching at least two respective points of interest along the first consolidated route.

22. A method comprising:
receiving an indication of a location;
receiving an indication of a category of points of interest;
identifying a plurality of points of interest associated with the category;
generating point of interest specific routes from the location to each of the plurality of points of interest;
identifying portions of the point of interest specific routes that are common to more than one point of interest;
generating a plurality of consolidated routes, wherein multiple points of interest are located along at least one of the plurality of consolidated routes; and
providing for presentation of the plurality of consolidated routes, wherein each of the plurality of consolidated routes is presented with a visual characteristic indicative of the number of points of interest of the plurality of points of interest that are located along the respective consolidated route, and wherein the visual characteristic of each of the plurality of consolidated routes changes as the respective consolidated route passes each point of interest along the respective consolidated route to reflect a percentage of points of interest remaining along the respective consolidated route.

23. The method of claim 22, wherein the plurality of consolidated routes are distinguished by at least one of: line weight of a line representing the respective consolidated route; line opacity of a line representing the respective consolidated route; line color of a line representing the respective consolidated route; or numerical identification of the respective consolidated routes.

24. The method of claim 22, wherein each of the plurality of consolidated routes are distinguished based, at least in part on the number of points of interest of the plurality of points of interest that are located along the respective consolidated route, and a weight afforded to the points of interest that are located along the respective consolidated route.

25. The method of claim 24, wherein the weight afforded to the points of interest are generated according to at least one of: relevance of the respective point of interest to the category of points of interest; popularity of the respective point of interest; user-reviews of the respective point of interest; or user preferences associated with properties of the respective point of interest.

26. The method of claim 22, wherein generating a plurality of consolidated routes comprises:
   identifying common segments of point of interest specific routes that are shared by two or more point of interest specific routes; and
   generating a consolidated route including the common segments of at least two point of interest specific routes.

27. The method of claim 22, wherein generating a plurality of consolidated routes comprises:
   clustering points of interest according to a spatial clustering algorithm to form at least one cluster of at least two points of interest; and
   generating a consolidated route from the location to the at least one cluster of at least two points of interest, wherein the consolidated route comprises a first segment to a first of the at least two points of interest of the at least one cluster, and a second segment between the first of the at least two points of interest and a second of the at least two points of interest.

* * * * *